United States Patent [19]
McGregor

[11] 3,759,099
[45] Sept. 18, 1973

[54] FLOWMETER
[76] Inventor: Rob Roy McGregor, 2951 Henesy, Imlay City, Mich. 48444
[22] Filed: Apr. 3, 1972
[21] Appl. No.: 240,560

[52] U.S. Cl. ................................................. 73/207
[51] Int. Cl. ............................................. G01l 3/26
[58] Field of Search ..................................... 73/206

[56] References Cited
UNITED STATES PATENTS
3,673,863  7/1972  Spacek.................................. 73/114
2,955,465  10/1960  Delaney................................. 73/207

Primary Examiner—Richard C. Queisser
Assistant Examiner—Arthur E. Korkosz
Attorney—Saragovitz et al.

[57] ABSTRACT

This invention relates to a flowmeter of particular structure providing immediate continuous indication of rate of fluid flow in a conduit by utilizing in the path of fluid flow a particular float structure the variable position of which directly corresponds to the variable rate of fluid flow, which variable position is immediately continuously indicated by a particularly arranged light source, a light sensor, and a readout device with necessary electrical circuitry.

2 Claims, 8 Drawing Figures

Patented Sept. 18, 1973    3,759,099

FLOWMETER

The invention described herein may be manufactured, used, and licensed by or for the Government for governmental purposes without payment to me or any royalty thereon.

BACKGROUND OF THE INVENTION

1. Field of the Invention. The accurate measurement of liquid flow is of significant importance in a wide variety of applications. Heretofore, considerable difficulties had been encountered in accurately measuring the rate of flow of fluid through a conduit. Many devices are known for measuring the flow rate of gas but a need exists in the art for an accurate and simple instrument which accurately measures the flow of fluids.

2. Prior Art. The art abounds in the availability of fluid flowmeters for measuring the rate of flow of liquid through a channel, tube, orifice, or some other form of conduit. Most of these devices require the operator to obtain the readout of the flow rate at the location of the device in the liquid flow system or necessitate that the operator perform mathematical calculations to arrive at the flow rate. Other flow rate meters give a visual readout flow rate at a remote location, where the readout indicator is physically dislocated from the actual meter, normally are very expensive as they require the use of oscillators, amplifiers and/or signal processing to yield a flow rate. In one rather common type of flowmeter the conduit through which the fluid passes is restricted and the resultant fluid pressure is measured both upstream and downstream from the constriction, the difference in pressure being a function of the flow rate. Such a method restricts the path of the fluid's flow and considerable computation is necessary to determine the actual flow rate from the measured data. Various types of flowmeters have been devised to overcome these difficulties. Most of these are dependant upon the maintenance of an apparatus which is rather bulky and critical in operation. Additionally, in most cases complicated calibrating steps or computations are required to transform the measured data into the actual flow rates.

SUMMARY OF THE INVENTION

The accurate measurement of fluid flow is of importance in a wide variety of applications. A novel and improved instrument for measuring the speed of fluids, which overcomes the disadvantages of prior art flowmeters and does not require sophisticated electronics to yield an accurate readout of rate of fluid flow, has eluded the art. The flowmeter of the present invention is comprised of a flow measuring device, having a variable orifice and float mechanism, a light source, a sensor, and a readout device.

The flow measuring device is a variable area meter which maintains a constant pressure differential but varies the orifice area with the flow. The mechanism consists of a tapered tube with a float positioned inside the tube by the action of the fluid flowing up the tube. The flow restriction is controlled by the annular area between the float and the tube. As the float rises the annular area increases.

It is therefore an object of my invention to provide a novel flowmeter which directly measures the rate of flow of fluid.

It is yet another object of this invention to provide such apparatus which accurately and repeatedly measures the level of fluid in a container by means which are sensitive, simple, and inexpensive.

Yet another object of the instant invention is to provide such apparatus yielding calibrated indications of the rate of flow and its direction.

A further object of the present invention is to produce an improved fluid speed indicator for conducting fluids which is simple in construction and operation, and wherein elimination of complicated electronic and electrical contacts with the conducting medium in measurement is obtained, thus avoiding all the associated problems encountered with the use of electrodes, clogging, temperature variations, and the like.

Other objects and advantages of the present invention will be apparent, to one of ordinary skill in the art, by referring to the following specification and drawings.

DESCRIPTION OF THE PREFERRED EMBODIMENT

Figure 1:
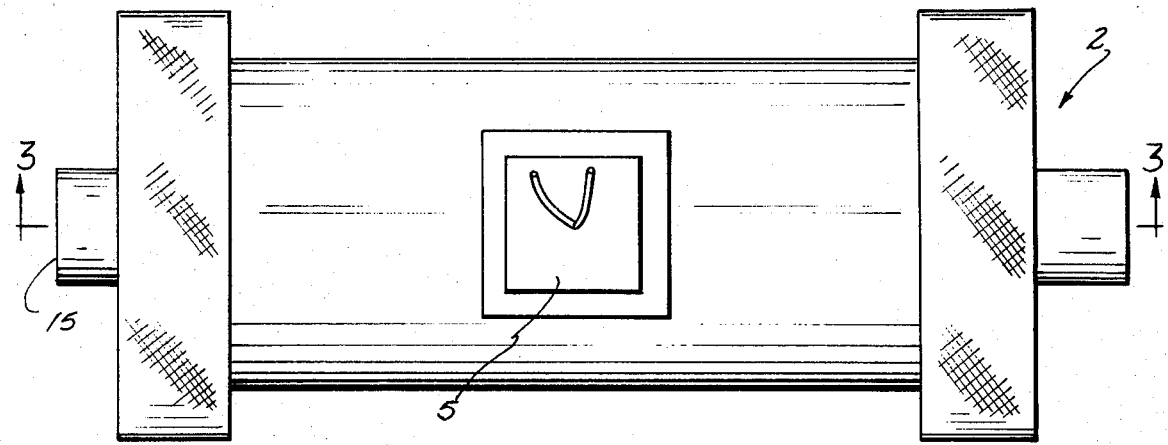
FIG. 1 is a front elevational view of the flowmeter embodying the invention.
Figure 2:
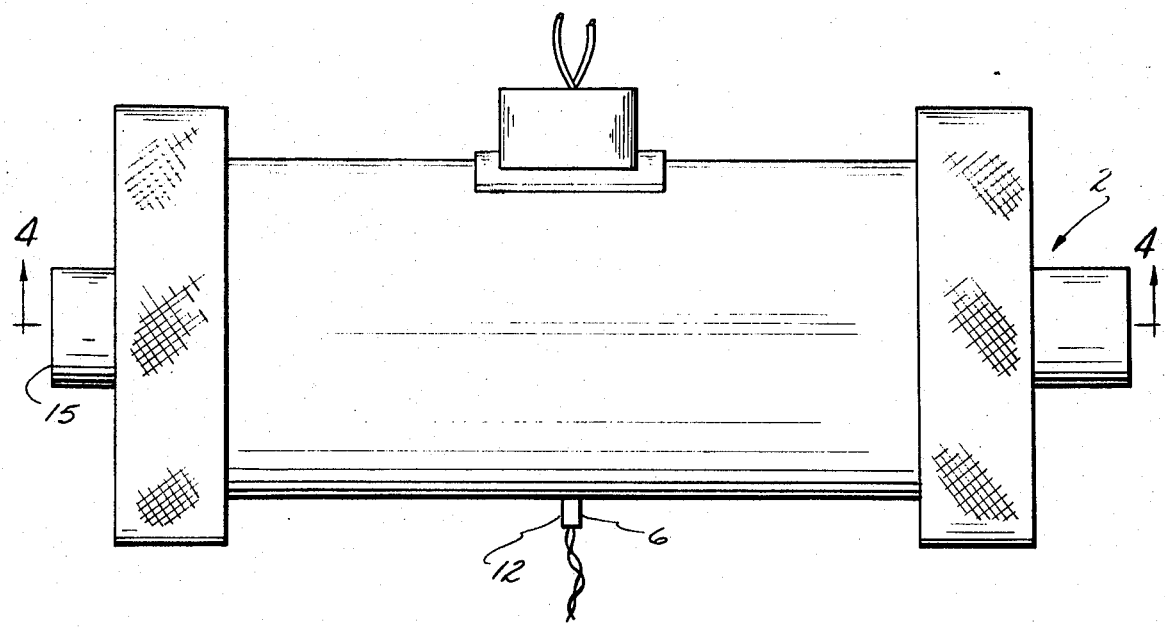
FIG. 2 is a side elevational view of the flowmeter.
Figure 3:
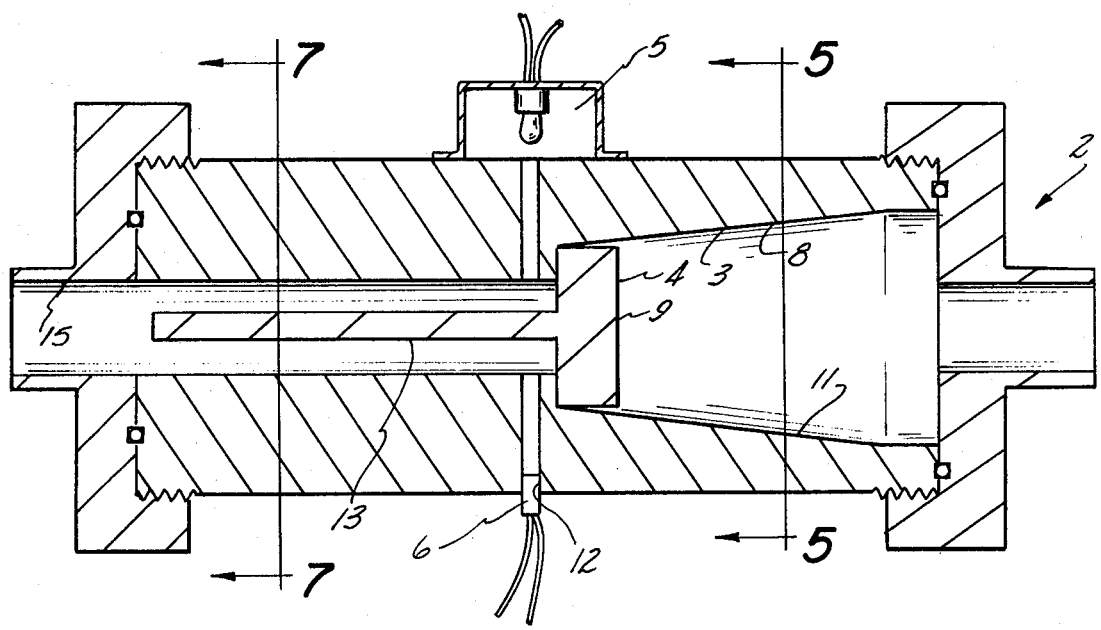
FIG. 3 is a horizontal cross-sectional view taken along line 2—2 of FIG. 1.
Figure 4:
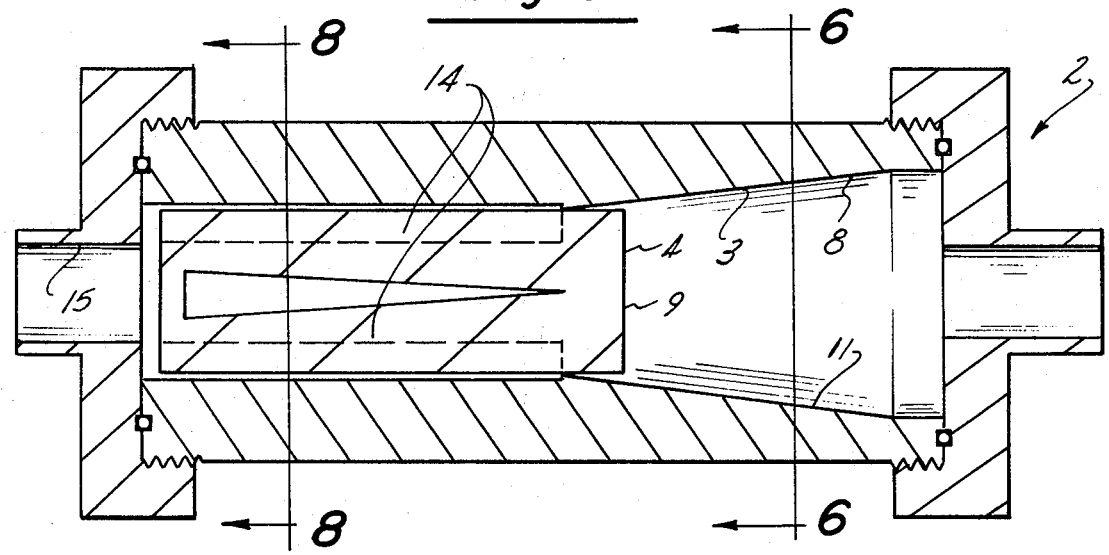
FIG. 4 is a cross-sectional view taken along line 3—3 of FIG. 2.
Figure 5:
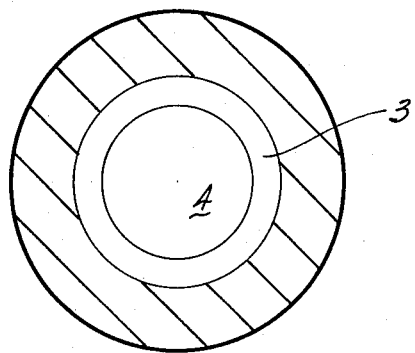
FIG. 5 is a cross-sectional view taken along line 5—5.
Figure 6:
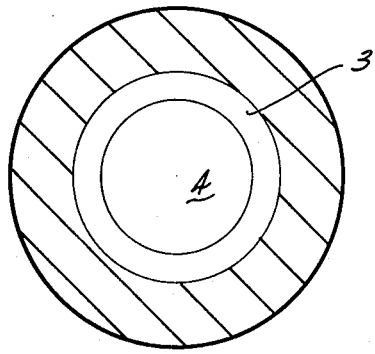
FIG. 6 is a cross-sectional view taken along line 6—6.
Figure 7:
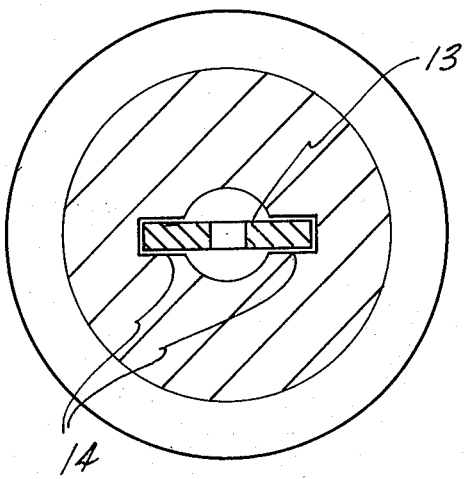
FIG. 7 is a cross-sectional view taken along line 7—7.
Figure 8:
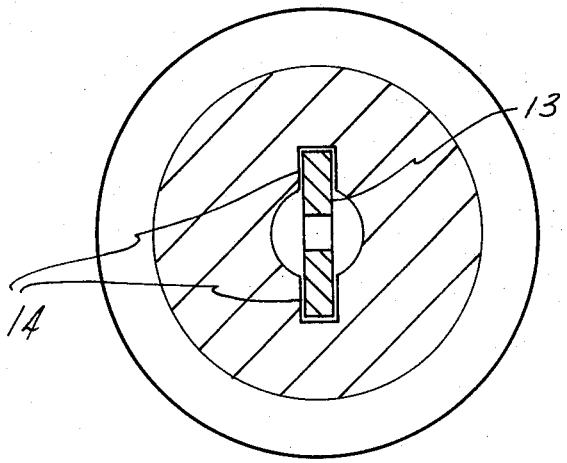
FIG. 8 is a cross-sectional view taken along line 8—8.

Referring first to the embodiment illustrated in FIGS. 1–3 of the drawing, fluid flow rate measuring and indicating device 2 has a tube with a cylindrical portion having a fluid entrance end 15 and with a tapered portion 8 extending and flaring outwardly toward the exit other end. In the tube is float 4 having a float portion 9 always in the tapered portion 8 and a partially transparent float stem 13 on and extending from the float portion 9 into the tube cylindrical portion toward the entrance end 15. Carried on opposite sides of device 2 and spaced from and at opposite respective sides of stem 13 is a light source 5 and a light sensor 6 with photo sensor 12 which with necessary energy circuitry provides an optically transparent path through the tube and the stem 13 varying in light intensity proportional to height of float mechanism 4 in the tube which corresponds to rate of fluid flow upwardly through the tube and which is indicated by a calibrated indicator readout device such as a milli-ammeter connected in series with the photo sensor 12.

Flow measuring device 2 is a variable area meter which maintains a constant pressure differential, but varies variable orifice's 3 area with the flow. The mechanism further comprises tapered tube portion 8 with float portion 9 positioned inside tube 8 by action of the fluid flowing up tapered tube portion 8. The flow restriction is controlled through the annular area, not shown on the drawing, between float portion 9 and tapered tube portion 8. As float 4 rises the annular area increases. The differential is fixed and is determined by the weight of float 4 and the buoyant forces.

Float 4 is the only moving part in this invention and consequently the flow rate is obtained by sensing the physical location of float 4 in tapered tube 8 or throat 11. Sensing of float 4 height is accomplished by use of light source 5 and photo sensor 12 placed on opposite sides of float stem 13. Float stem 13 is either partially transparent, with gradually increasing transparency, or a nonrotating stem with a triangular transparent slit. The amount of light transmitted through float stem 13 is directly proportional to float 4 height. Slots 14, cut on both sides of entrance tube 15 cylindrical portion, prevent float 4 and float stem 13 from rotating by riding up and down these slots. To assure linearity of light input signal to photo sensor 12, light source 5 is collimated by either the use of optics or collimation is achieved by transmittance through a small aperture or slit. Collimation is further achieved by use of an optically transparent path through the flowmeter housing. The optical path has a small cross-section in relation to its length. As the flow rate increases float 4 rises and the amount of light incident on light sensor 6 increases linearly as a function of float 4 height. Float stem 13 has a linearity of light transmittance as a function of position.

Various electromagnetic radiating sources and suitable detectors amy be used for photo sensor 12 which along with light source 5 varies its resistance as a function of light signal received. One such light source may be cadmium sulfide photo-detector but others are also suitable.

By placing a milli-ammeter, not shown in the drawings, in series with photo sensor 12, and a voltage supply in the circuit, a current will flow through the milli-ammeter which measures the voltage supply in the circuit and consequently the height of float 4 is indicated as a current.

The design of flow measuring device 2 for different ranges of flow rate and fluids of varying density is determined by taper of tube 8, dimensions of float 4, mass and other inherent fluid properties.

The volumetric flow ($Q$), as measured by the flowmeter of this invention, is proportional to the difference in area between throat 11 ($A_t$) and area of float 9 ($A_f$). Variables such as fluid density, float density and float volume enter into the calculations but appear as a multiplying factor in the equation for volumetric flow: $Q = C(A_t - A_f)$, where volumetric flow is a product of the areas between throat 11 and float portion 9 times a temperature constant.

I wish it to be understood that I do not desire to be limited to the exact details of construction shown and described for obvious modifications will occur to a person skilled in the art.

What I claim is:

1. A flowmeter for measuring rate of fluid flow upwardly therethrough comprising, in combination,
   a. a housing including a tube with fluid entrance and exit ends, said tube having
      1. an inner tapered portion flaring outwardly toward said exit end,
      2. an inner cylindrical portion extending from said tapered portion toward said entrance end,
   b. a float positioned in said tube for rise movement variable with rate of fluid flow upwardly through said tube, said float having
      1. a float portion in said tapered portion and forming therebetween an annular area variable correspondingly with variable rise movement of the float, and
      2. a partially transparent stem on said float portion and extending therefrom in said cylindrical portion, the partial transparency of the stem increasing with stem length distance from said float portion and providing thereby for a linearity of light transmission through the stem as a function of position of said float,
   c. a collimated light source and a photo sensor with circuitry therefor and carried by said tube at said cylindrical portion adjacent said tapered portion at and spaced from respective opposite sides of said stem, providing through flowmeter an optically transparent path of cross-section small relative to length, and
   d. a calibrated fluid flow rate indicator comprising a milli-ammeter connected in series with said photo sensor.

2. The combination as set forth in claim 1, wherein said stem is nonrotating and has a triangular transparent slit therethrough with apex thereof at the stem end adjacent said float portion.

* * * * *